United States Patent
Sakamoto et al.

(10) Patent No.: US 8,774,234 B2
(45) Date of Patent: Jul. 8, 2014

(54) DATA PROCESSING APPARATUS, DATA PROCESSING METHOD, AND COMPUTER-READABLE STORAGE MEDIUM

(75) Inventors: Isao Sakamoto, Kawasaki-shi (JP); Hisashi Ishikawa, Urayasu-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 451 days.

(21) Appl. No.: 12/815,984

(22) Filed: Jun. 15, 2010

(65) Prior Publication Data

US 2010/0329267 A1 Dec. 30, 2010

(30) Foreign Application Priority Data

Jun. 25, 2009 (JP) ................... 2009-151478

(51) Int. Cl.
*H04L 12/26* (2006.01)
*G06T 1/20* (2006.01)

(52) U.S. Cl.
CPC ....................... *G06T 1/20* (2013.01)
USPC ........... 370/546; 370/254; 370/258; 370/400; 370/403

(58) Field of Classification Search
USPC ................... 370/254, 258, 400, 403
See application file for complete search history.

(56) References Cited

U.S. PATENT DOCUMENTS

| 6,529,518 B1 * | 3/2003 | Webber .................... 370/403 |
| 7,379,067 B2 * | 5/2008 | Deering et al. ............... 345/506 |
| 2002/0015413 A1 | 2/2002 | Kaganoi | |

FOREIGN PATENT DOCUMENTS

| JP | 63-240663 A | 10/1988 |
| JP | 9-091262 A | 4/1997 |
| JP | 10-228445 A | 8/1998 |
| JP | 11-167560 A | 6/1999 |
| JP | 2005-521178 A | 7/2005 |

* cited by examiner

*Primary Examiner* — Dang Ton
*Assistant Examiner* — Robert M Morlan
(74) *Attorney, Agent, or Firm* — Canon USA, Inc., IP Division

(57) ABSTRACT

A data processing apparatus includes an input unit to input data and processing modules. The processing modules may be connected as part of a ring-shaped data transfer path to transfer data in one direction. Each processing module includes a communication unit configured to implement a first data processing path and a setting path and a processing unit configured to process data received by the communication unit. When using switching data to switch the processing modules performing on the first data processing path to the processing modules performing on the setting path, the switching data is processed on the first data processing path.

16 Claims, 10 Drawing Sheets

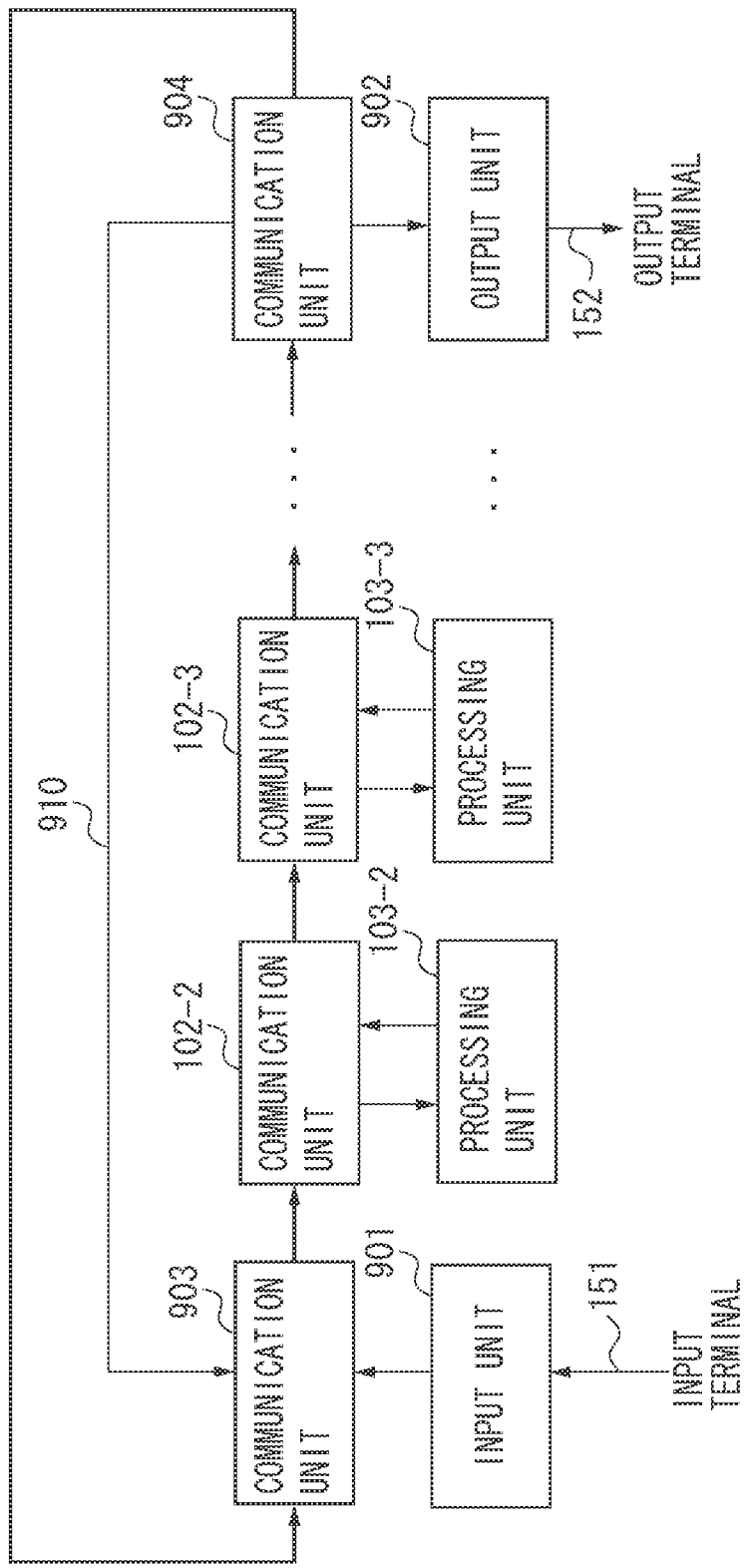

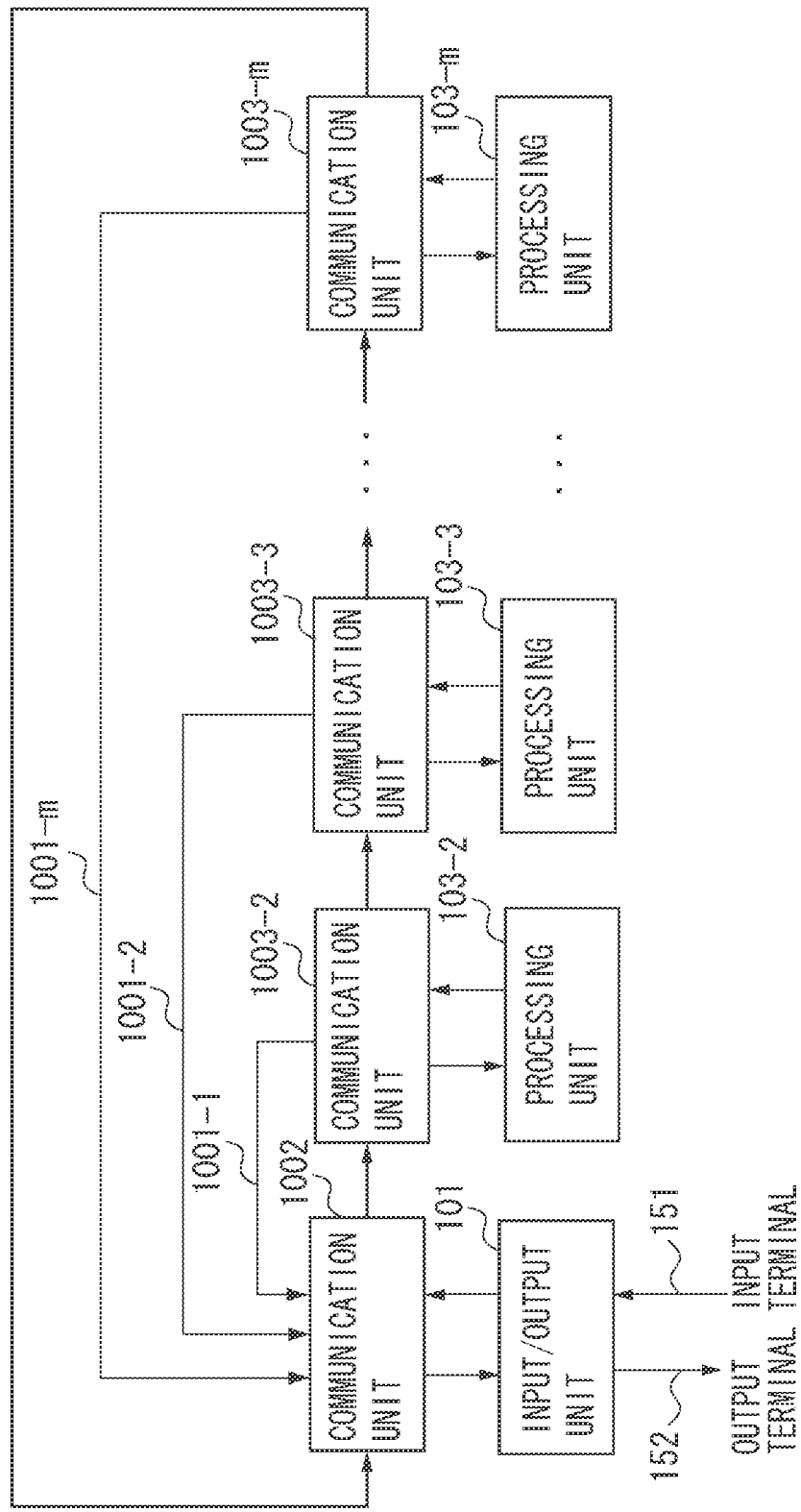

US 8,774,234 B2

DATA PROCESSING APPARATUS, DATA PROCESSING METHOD, AND COMPUTER-READABLE STORAGE MEDIUM

BACKGROUND OF THE INVENTION

1. Field of the Invention

The present invention relates to a data processing apparatus provided with a ring-shaped data transfer path that connects a plurality of modules and an information processing method wherein the modules are processed by flexibly switching usage sequences, and relates to a computer-readable storage medium.

2. Description of the Related Art

A data processing apparatus for performing data processing by a plurality of modules connected to a ring-shaped data transfer path is discussed (Japanese Patent Application Laid-Open No. 11-167560, Japanese Patent Application Laid-Open No. 9-091262). In the ring-shaped data transfer path, a unit for temporarily storing received data is provided in each of the modules, so that the data transfer path can be divided into independent partial transfer paths, and the data can be independently transferred between the modules. With this configuration, data equivalent to a number of the modules is transferred in parallel, thereby enhancing transfer efficiency of the data.

In order to implement the data transfer between the modules, in a technology discussed Japanese Patent Application Laid-Open No. 11-167560, data to be transferred has destination information representing a module at its destination. In addition, in Japanese Patent Application Laid-Open No. 9-091262, an ID of a module is changed, without dedicated arithmetic circuits and signal lines, by providing an ID register and an ID setting flag for setting an ID for each module.

In the above-described methods, when processing of data is in progress according to a predetermined data path in a module or a ring bus, it is difficult to switch between the data paths while processing the data currently being processed. This is because, if data that is following an old data path is processed as the data is by a module in which a new data path has been set up, the processing may fail in some cases. For this reason, in the conventional method, if data along the old data path is left in a module or a ring bus when switching data paths, it is necessary to wait until predetermined processing of the left data is completed and the data is diverted from the module or the ring bus, for example. Accordingly, switching the data paths cannot be efficiently executed by the methods discussed in Japanese Patent Application Laid-Open No. 11-167560 and Japanese Patent Application Laid-Open No. 9-091262.

SUMMARY OF THE INVENTION

According to the present invention, timing can be determined for efficiently switching between a data path for transferring data, and a data path for control for flexibly switching between usage sequences of modules. Consequently, it becomes also possible to efficiently switch the data paths, and to earlier input the data to be processed by the data path after switching.

According to an aspect of the present invention, in a data processing apparatus, data is input from an input unit into a plurality of processing modules connected in a ring-shaped manner, and each of the plurality of processing modules transfer the data in one direction. Each processing module includes a communication unit configured to implement a first data processing path for transferring data in such a manner that the plurality of processing modules perform processing in a set sequence, and to implement a setting path for transferring data in such a manner that the plurality of processing modules perform processing in a sequence in which they are connected. Each processing module also includes a processing unit configured to process data that the communication unit has received, and to output the data to the communication unit. When switching from a state in which the plurality of processing modules are processed on the first data processing path to a state in which the processing modules are processed on the setting path, the switching data for switching to a state in which the processing modules are processed on the setting path are processed on the first data processing path.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B are block diagrams illustrating schematic configurations of the data processing apparatus.

DESCRIPTION OF THE EMBODIMENTS

Various exemplary embodiments, features, and aspects of the invention will be described in detail below with reference to the drawings.

Figure 1:
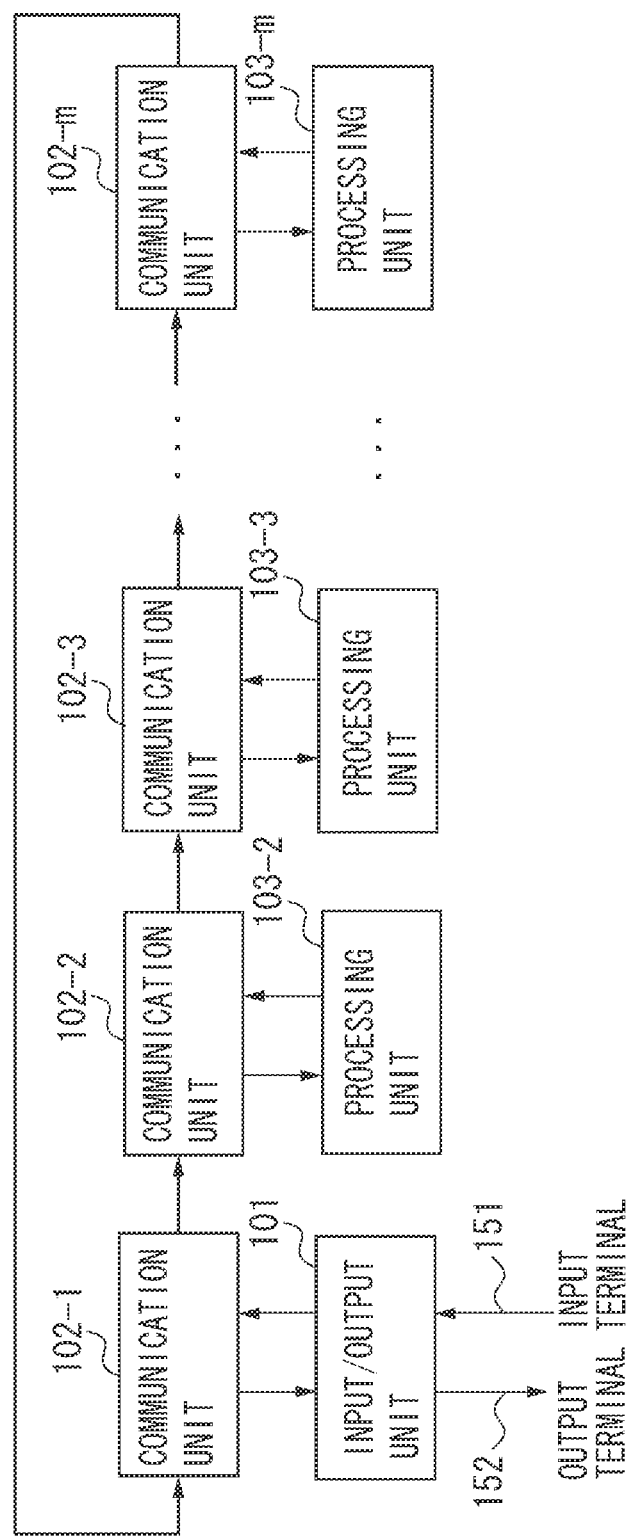
FIG. 1 is a block diagram illustrating a schematic configuration of a data processing apparatus.

FIG. 1 is a block diagram illustrating a schematic configuration of a data processing apparatus according to a first exemplary embodiment of the present invention. In FIG. 1, a data input/output unit 101 inputs data to be processed and outputs data that has been processed. Further, communication units 102-1 through 102-m (hereinafter, collectively referred to as communication unit 102) are connected as pairs with data processing unit 103-2 through 103-m (hereinafter, collectively referred to as data processing unit 103), respectively, to form processing modules. In other words, each processing module may include a communication unit 102 and a processing unit 103 connected to that communication unit 102. In FIG. 1, arrows indicate one way directions in which data (or packets) are circulated, and each processing module connected to a ring-shaped data transfer path in a ring-shaped manner receives data from one direction and transmits the data downstream in that same direction.

The communication units 102-1 through 102-m each are connected to adjacent communication units (except the communication unit 102-*m* is connected to the communication unit 102-1), and constitutes a ring-shaped data transfer path (hereinafter, referred to as a ring bus). In other words, the communication units 102-1 through 102-*m* constitute a ring bus, and performs transmission and reception of data between the ring bus and the data input/output unit 101 or the data processing units 103. Accordingly, the data processing units 103-2 through 103-*m* are connected to the communication units 102-2 through 102-*m*, respectively.

Data input from an input terminal 151 is input into the communication unit 102-1 via the data input/output unit 101. The input data is packetized and circulated over the ring bus. The communication unit 102 captures necessary packet from the ring bus according to the preset information, extracts data from the captured packet, and inputs the data into the data processing unit 103. The data processing unit 103 performs predetermined data processing (e.g., color space conversion or resolution conversion), and outputs the data after it has been processed to the communication unit 102.

After the data has been processed, the communication unit 102 packets and circulates the processed data over the ring bus. Thus, the data continues to be processed one after another in the data processing units 103-2 through 103-*m* in the preset/predetermined sequence, by the communication units 102-2 through 102-*m*. Then, when the set data processing is terminated, the data in the communication unit 102-1 is captured by the data input/output unit 101, and is output from the output terminal 152. The data input/output unit 101 is used to interface with external devices (or external modules), but if direct interface can be performed by the communication unit 102-1, data input/output unit 101 can be omitted.

An operation outline of a data processing apparatus according to the present exemplary embodiment will be described below. In the data processing apparatus according to the present exemplary embodiment, a plurality of data processing units 103 that perform a predetermined data processing and the data input/output unit 101 are connected in a ring-shaped manner in a predetermined sequence via respectively corresponding communication units 102. The predetermined sequence may be a serial arrangement of processing modules in which each processing module follows another processing module in logical order. As described below in connection with FIG. 2, each of the communication units 102 includes a reception unit 201 that receives data from a communication unit 102 in the preceding sequence, and a transmission unit 204 that transmits data to a communication unit 102 at the next stage. Further, connection ID information (first identification information, second identification information) for identifying logic sequence of the data processing is assigned to each of the reception unit 201 and the transmission unit 204. In such a configuration, the communication units 102 having received a packet having the same ID information as the connection ID information assigned to the reception unit 201 of the communication unit 102, causes the corresponding data processing unit 103 to perform the data processing on the packet. Then, the communication units 102 sets/adds to the processed data packet the connection ID information assigned to the transmission unit 204 of the communication unit 102, and transmits the packet to the communication unit 102 that is positioned next in the sequence. On the other hand, if the communication unit 102 received a packet having an ID that is not the same as the connection ID information assigned to the reception unit 201 of the communication unit 102, then the communication unit 102 transmits the packet to the communication unit 102 positioned next in the sequence without changing the ID information of the transmitted packet. In this way, data processing having a complicated data path can be efficiently implemented by assigning the connection ID information to each of the reception unit 201 and the transmission unit 204 to control a transmission route of the packet.

In practice, a packet continues to be transferred in one direction over the ring bus, but data stored in the packet can be processed by a plurality of processing modules in a desired data path according to the above-described methods.

Figure 4A:
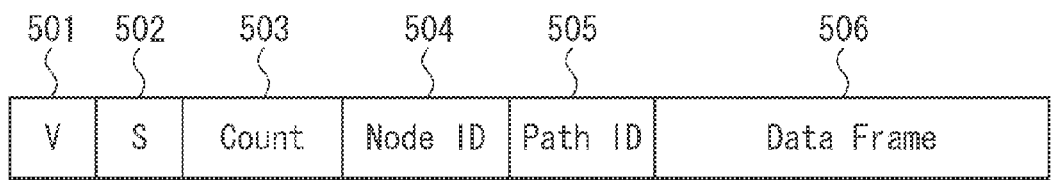
FIGS. 4A, 4B, and 4C illustrate a format of a packet and a format of data fields.

FIG. 4A illustrates one configuration example of a packet circulating on a ring-shaped data transfer path. A field 501 stores a valid flag indicating that a packet is valid, a field 502 stores a stall flag indicating that a packet is in reception suspend mode, a field 503 stores a count value indicating a transmission sequence of data. Further, a field 504 stores a connection ID for identifying logic connection of the data, a field 505 stores a path identifier for identifying the data path in which the data is being transferred, and a field 506 stores the data to be processed.

Figure 2:
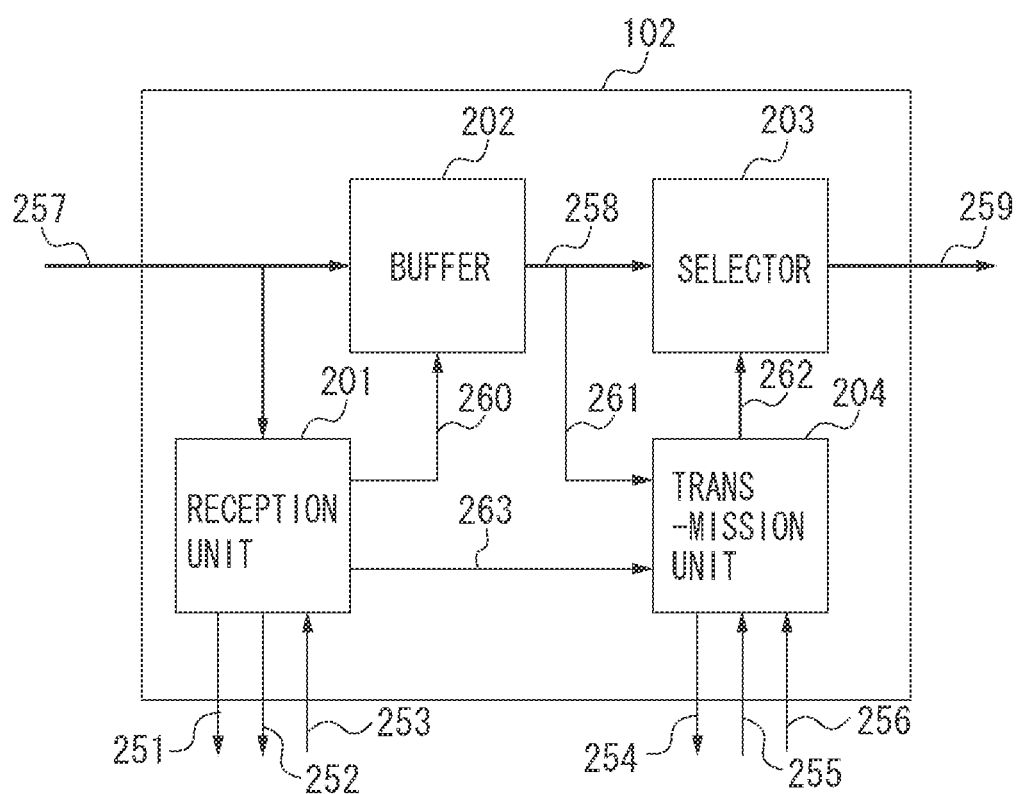
FIG. 2 is a block diagram illustrating a schematic configuration of a communication unit.

FIG. 2 is a block diagram illustrating a schematic configuration of the communication unit 102. While each processing module may include a communication unit 102 and a processing unit 103 connected to that communication unit 102, a module having the communication unit 102 and the input/output unit 101 is an input module and may be thought of as a processing module. As illustrated in FIG. 2, the communication unit 102 includes a data reception unit 201, a buffer 202, a selector 203, and a data transmission unit 204.

An output terminal 259 and an input terminal 257 of adjoining communication units 102 are connected, such that the communication units 102-1 through 102-*m* constitute a ring-shaped data transfer path. Further, the data processing unit 103 (one out of 103-2 through 103-*m*) is assumed to be connected to signal lines 251 through 256. A packet input from an adjacent communication unit 102 is held temporarily in the buffer 202, and is output to the selector 203 in the next clock cycle.

The data reception unit 201 monitors a packet of an input terminal 257, captures the packet and outputs a data portion of the packet from the output terminal 252 to the data processing unit 103 (by making the valid signal 251 enabled), if all of the following conditions are satisfied:
a valid flag 501 of a packet is valid,
a connection ID 504 and a count value 503 match the values held by the data reception unit 201, and
data can be input into the connected data processing unit 103 (e.g., a stall signal 253 is not in suspend state).
At this time, the data reception unit 201 notifies the buffer 202 of the capture of the data portion of the packet via a signal line 260, clears a valid flag 501 of the packet stored in the buffer 202, and invalidates the packet. After the packet has been captured, the count value 503 which the data reception unit 201 holds is incremented.

On the other hand, the data reception unit 201 notifies the buffer 202 of suspension of the data via the signal line 260, and sets up a stall flag 502 of the packet stored in the buffer 202 if all of the following conditions are satisfied:
the valid flag 501 of an input packet is valid,
the connection ID 504 and the count value 503 match the values held by the data reception unit 201, and
input of data to the connected data processing unit 103 is impossible such that data cannot be input into the connected data processing unit 103.
The above two conditions presuppose that the connection ID 504 and the count value 503 each match the values held by the data reception unit 201. However, if the count value 503 does not agree, the capture of data is impossible, even though the valid flag 501 of the input packet is valid and the connection ID 504 agrees. Therefore, if the count value 503 does not agree, the data reception unit 201 also sets up the stall flag 502. As described below in an operation example, a count value does not need to be evaluated, depending on a processing content, in determining whether to receive a packet.

The data transmission unit 204 monitors the valid flag 501 of an output packet (signal line 258 and signal line 261) of the buffer 202. Since the data cannot be output over the ring bus when the valid flag 501 is enabled, the data transmission unit 204 sets up the stall signal 254 for suspending output of the data from the connected data processing unit 103 through the input terminal 255. On the other hand, the data transmission unit 204 resets the stall signal 254, when the valid flag 501 is not enabled. The data transmission unit 204 makes the valid flag 501 enabled and the stall flag 502 invalid, and generates a packet by adding the count value 503 and the connection ID set to the register if both of the following conditions are satisfied:

data can be output from the connected data processing unit 103 (if the valid signal 256 is enabled), and the valid flag 501 of an output packet of the buffer 202 is not enabled.

Then, the generated packet is circulated over the ring bus from the output terminal 259, by controlling the selector 203. After the packet has been output, the count value 503 held by the data transmission unit 204 holds is incremented. As will be described below in the operation example, the count value may not be incremented in the configuration in which the count value is not to be evaluated.

Figure 3A:
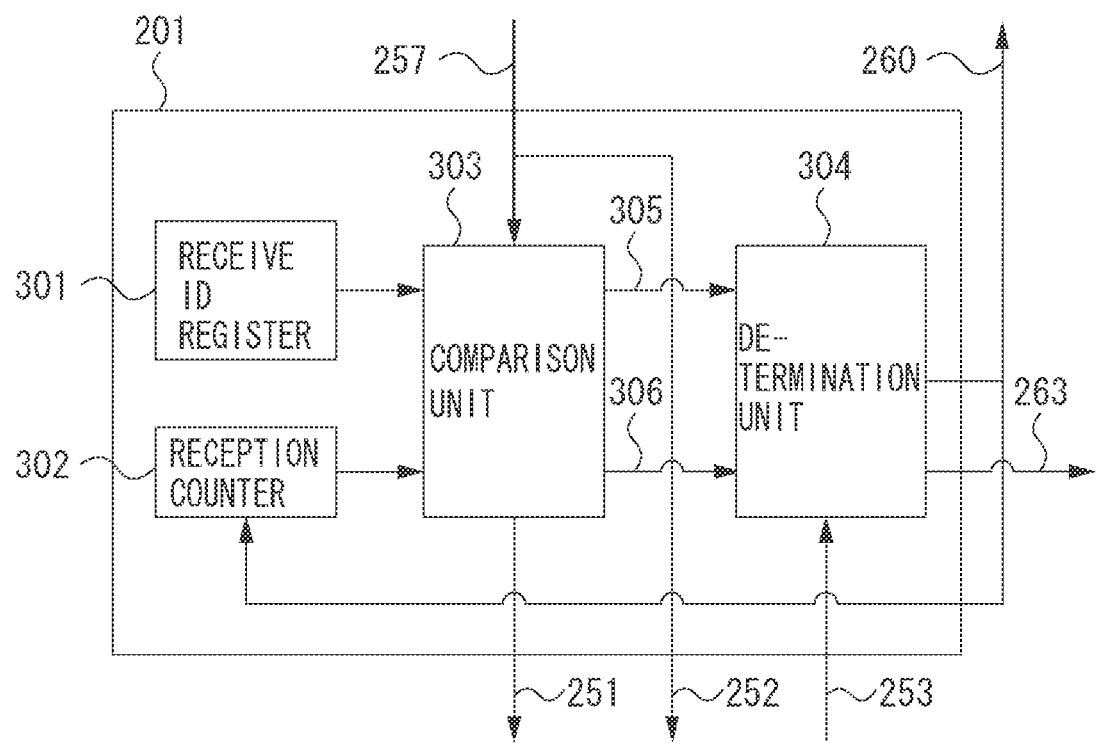
FIGS. 3A and 3B are block diagrams illustrating schematic configurations of a data transmission unit and a data reception unit.

FIG. 3A is a block diagram illustrating a schematic configuration of the data reception unit 201. As illustrated in FIG. 3A, the data reception unit 201 includes a receive/reception ID register 301, a reception counter 302, a comparison unit 303, and a determination unit 304.

The comparison unit 303 monitors the valid flag 501, the connection ID 504, and the count value 503 of a packet over the ring bus input from the input terminal 257. Then, the comparison unit 303 makes the valid signal 251 enabled, if all of the following conditions are satisfied:

the valid flag 501 of packet is enabled, the connection ID 504 of the packet matches the connection ID stored in the receive ID register 301, and the count value 503 of the packet matches a value of the reception counter 302. The data portion of the packet is output to the output terminal 252. The comparison unit 303 inputs a count value match signal 305 and a data processing completion detection signal 306 to the determination unit 304.

Regarding a packet of which valid flag 501 is enabled, if a connection ID 504 (first identification information) of a packet has matched with a connection ID 504 stored in the receive ID register 301 (first storage unit), the comparison unit 303 outputs a signal (ID match signal) indicating that these signals have agreed. In addition, if a count value 503 of the packet has matched with a value of the reception counter 302, the comparison unit 303 outputs a signal indicating that these have agreed as a count value match signal. The comparison unit 303 outputs an input packet determination signal and the count value match signal through the signal line 305 to the determination unit 304. If the comparison unit 303 is configured to output the count value match signal 305 only when the comparison unit 303 has satisfied a condition for outputting the input packet determination signal, then the comparison unit 303 does not need to output the packet determination signal to the determination unit 304.

The data processing completion detection signal 306 indicates, as will be described below, that a series of data processing has been completed and data to be output has been received.

The determination unit 304 determines whether the data processing unit 103 has been able to capture data, according to the input packet determination signal and the count value match signal 305, and the stall signal 253 from the connected data processing unit 103. Then, if it is determined that the data has been captured, the determination unit 304 notifies the buffer 202 of the capture of the data via the signal line 260, clears a valid flag 501 of a packet stored in the buffer 202, and invalidates the packet. To branch the data (for use in a plurality of data processing units), packet invalidation processing is designed to be capable of turning on or off by a central processing unit (CPU) or the like.

A data capture notification signal 260 also is input into the reception counter 302 and, if it is determined that the data has been captured, the determination unit 304 increments (+1) the count value of the reception counter 302 in the next clock cycle, in order to acquire the next data. On the other hand, if it is determined that data to be captured cannot be captured according to the input packet determination signal, the count value match signal 305, and the stall signal 253 from the connected data processing unit 103, then the determination unit 304 suspends reception of the data. More specifically, the reception unit 201 notifies the buffer 202 of suspension of the data via the signal line 260, and sets up the stall flag 502 of the packet stored in the buffer 202. If a capture sequence of the data may not agree, even though the packet is a capture target packet, according to the input packet determination signal and the count value match signal 305, the reception unit 201 performs the similar suspension processing.

In addition, the determination unit 304 determines whether a series of data processing has been completed, according to the data processing completion detection signal 306 and the stall signal 253 from the connected data processing unit 103, and outputs the determination result to the signal line 263.

Figure 3B:
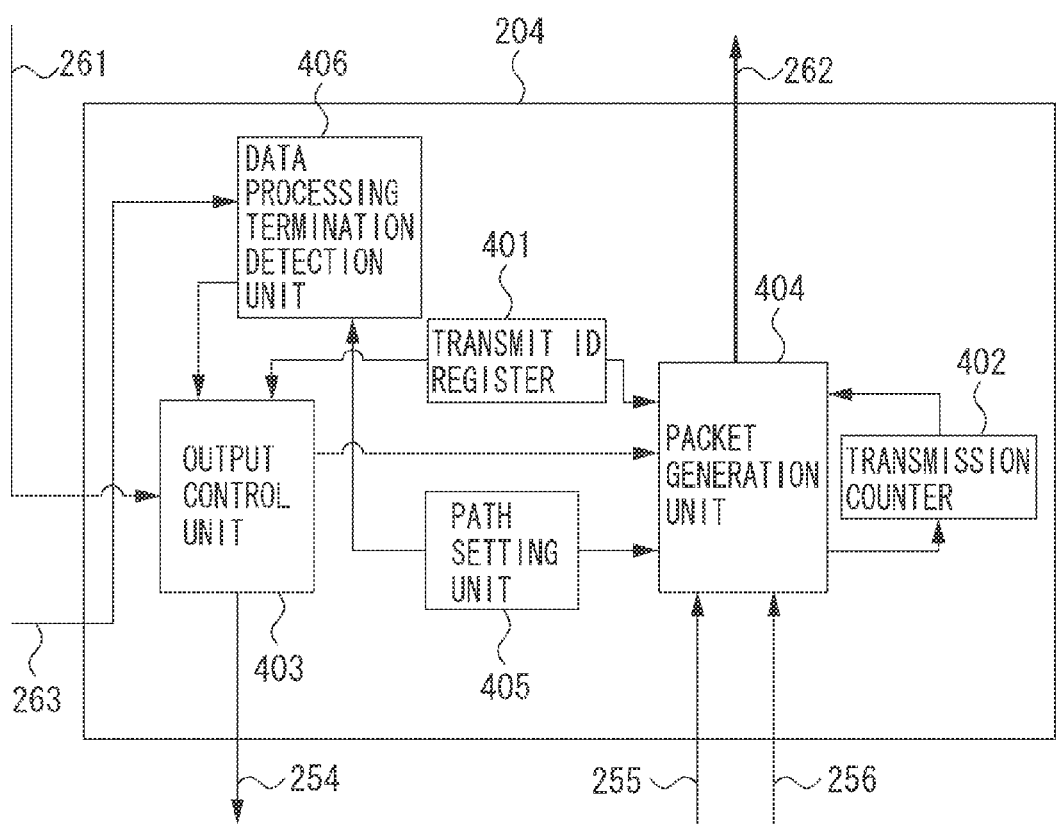

FIG. 3B is a block diagram illustrating a schematic configuration of the data transmission unit 204. As illustrated in FIG. 3B, the data transmission unit 204 includes a transmit ID register 401, a transmission counter 402, an output control unit 403, a packet generation unit 404, and a path setting unit 405.

The output control unit 403 monitors a valid flag 501 and a stall flag 502, and a connection ID 504 of an output packet (signal line 258) of the buffer 202. When the valid flag 501 is enabled, the data cannot be output to the ring bus. Accordingly, the output control unit 403 sets up a stall signal 254 for suspending data output of a pair of the data processing units 103. On the other hand, when the valid flag 501 is not enabled, the output control unit 403 resets the stall signal 254.

The output control unit 403 determines that a packet, which the unit itself has output, returns after circulating the ring bus without being suspended by any other processing module if both of the following conditions are satisfied:

the valid flag 501 of the output packet of the buffer 202 is enable and the stall flag 502 does not indicate suspension, and the connection ID 504 of the output packet of the buffer 202 matches the connection ID (second identification information) stored in the register 401 (second storage unit).

Then, the output control unit 403 controls the selector 203 via the packet generation unit 404, and renders the valid flag 501 invalid to invalidate the packet. In this case, since it becomes possible to output the packet of the data processing units 103, the output control unit 403 resets the stall signal 254. The output control unit 403 sets up the stall signal 254, even when the data path is switched, as described below.

The packet generation unit 404 refers to a valid signal 256 of the connected data processing unit 103. Then, if it is determined that data can be output from the data processing unit 103 (when the valid signal 256 is valid), the output packet of the buffer 202 presents the following two cases:

- a case where a valid flag 501 of an output packet is not enabled, and
- a case where extraction of data has been finished and a packet is to be invalidated (when a valid flag 501 is enabled and a stall flag 502 is not indicating suspension, a connection ID 504 of a packet matches with a connection ID stored in the register 401). In either of these two cases, the packet generation unit 404 renders the valid flag 501 valid, and the stall flag 502 invalid, and generates a packet by adding a count value of the reception counter 402 and a connection ID set in the register 401 and a path identifier of the path setting unit 405. Then, the transmission unit 204 controlling the selector 203 causes the generated packet to circulate around the ring bus from the output terminal 259. Then, the packet generation unit 404 increments (+1) a count value of the transmission counter 402 in the next clock cycle. The transmission counter 402 of the data transmission unit 204 and the reception counter 302 of the data reception unit 201 that receives a packet of the data transmission unit 204 are initialized to the same value before starting data transfer, for synchronization with each other.

Figure 4B:
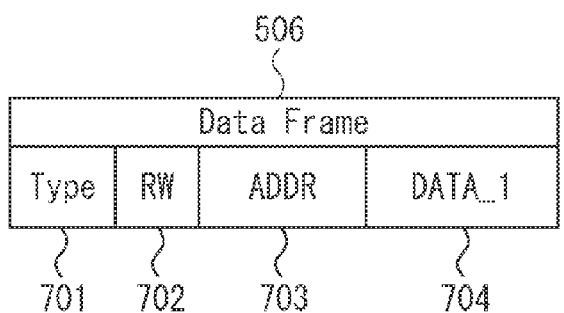

FIG. 4B illustrates a format of data 506 when a register of the path setting unit 405 is accessed to change a value of the register. A packet that stores the data 506 is as illustrated in FIG. 4A, and description thereof has previously been presented. A data type 701 indicates a type of the data 506. A reading/writing RW flag 702 indicates whether the register is accessed for the purpose of reading or for the purpose of writing. An address 703 indicates an access destination, and data 704 is data that has been read out or data to be written. The address 703 may be acceptable as long as the address 703 is information by which one of the processing modules can be identified. As described below, setting path start data stored in a setting path start packet (switching data), and connection ID change data stored in a connection ID change packet adopt a format of the data 506.

Next, outline of processing of switching data paths will be described below. A setting path is a data path that transfers data for changing the connection ID or the like. A data processing path is a data path that transfers both data to be processed in the processing unit 103 and data for changing a setting of a register of the processing unit 103. In the present exemplary embodiment, when "0" is stored in a register of the path setting unit 405 of a processing module, the processing module operates in a setting mode. On the other hand, when "1" is stored, the processing module operates in a data processing mode. The processing module that operates in the setting mode neglects values in the fields 501 through 505 and captures data in the field 506 with respect to a packet to be input.

Figure 5:
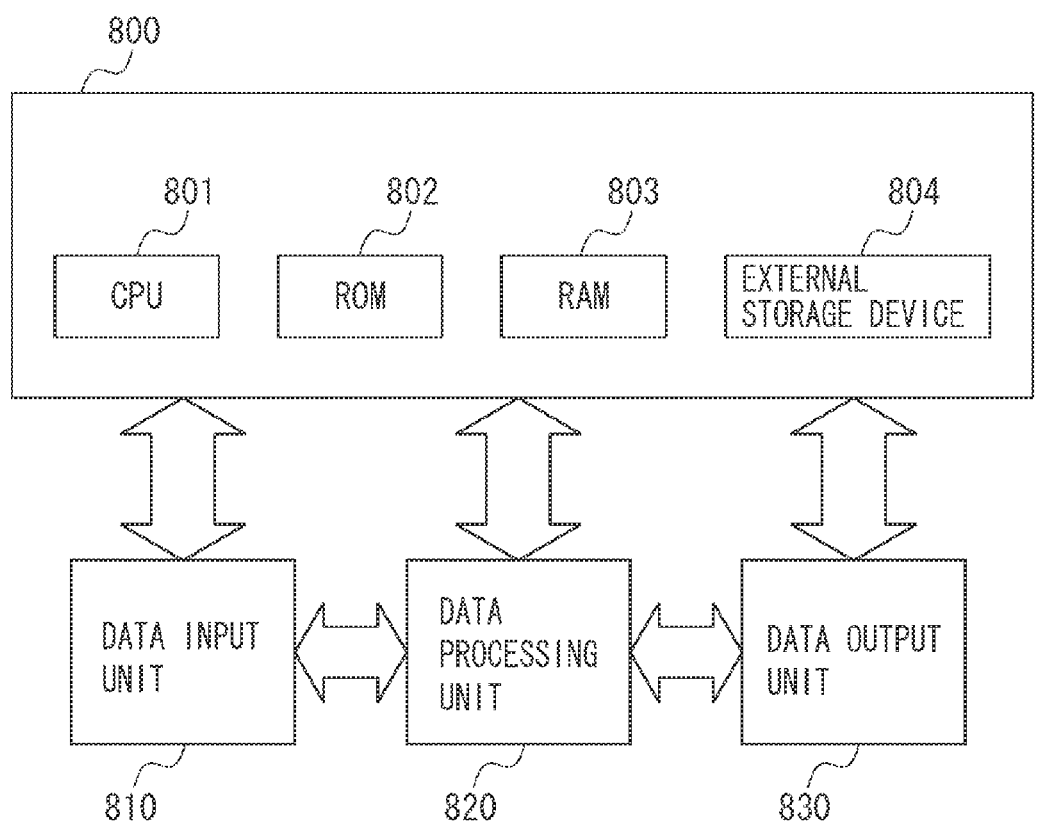
FIG. 5 is a block diagram illustrating a configuration of a system having the data processing apparatus.

FIG. 5 illustrates a schematic configuration of a data processing apparatus including a data processing unit 820. If the data processing path (data processing path 1) is currently operating, when a new data processing path (data processing path 2) is set, a system control unit 800 inputs a setting path start packet from the input terminal 151 of the data input/output unit 101 after the data to be processed by the data processing path 1. The setting path start packet is a packet for switching each processing module currently being processed on the data processing path 1, to a setting path. Each processing module is changed to the setting mode by changing the path setting unit 405 of each processing module in the data processing mode.

On the other hand, if there is no possibility that the data processing path 1 is currently operating (such as a case where all processing modules are initialized to the setting mode, during activation), the setting path may be started without circulating the setting path start packet.

In the setting path, the connection ID change packet is transmitted to the communication units 102 of the input module and all processing modules connected to the same ring bus. The connection ID change packet stores connection ID change data, which is data for setting new connection ID, so that each module can operate the data processing path 2. Then, each processing module performs change processing of the connection ID in connection sequence (in case of broadcast, equivalent to a reception sequence of the connection ID change packet). The connection ID change packet is output by the data input/output unit 101 from the ring bus, after having circulated all modules connected to the ring bus.

Herein below, processing of switching data paths will be described in detail. If data of a packet that the data processing unit 103 captured from the communication unit 102 is setting path start data, the data processing unit 103, when the stall signal 254 becomes a reset state, outputs the setting path start data as it is to the transmission unit 204 via the input terminal 255. Then, if the setting path start data indicates write (write access) to the path setting unit 405, the packet generation unit 404 packetizes the setting path start data, and outputs the setting path start data from the terminal 262 to the ring bus. Moreover, the packet generation unit 404 rewrites a setting value of the path setting unit 405 to a value representing the setting path in the next clock cycle, and the path setting unit 405 sends a signal indicating that the setting value has been changed, to a data processing termination detection unit 406. When a signal indicating that the setting value has been changed to "0" comes from the path setting unit 405, the data processing termination detection unit 406 outputs a message indicating it is detected that a state of the processing module has been switched to the setting mode to the output control unit 403. Moreover, the output control unit 403, responsive to a state where the data path is currently being switched, sets the stall signal 254. This inhibits a packet following the setting path start data that has changed a setting of the path setting unit 405, from being transferred between the communication units 102.

When the communication unit 102-1, which can directly suspend an input from the input/output unit 101, has received the setting path start data, an input of the data may be temporarily inhibited. In this case, if the communication unit 102-1, which has suspended the input from the input/output unit 101 according to a suspension signal 254, receives again the setting path start data from other processing modules, then it clears the suspension signal 254. The communication unit 102-1 may invalidate the setting path start data that has been received again.

The setting path start packet switches respective processing modules to the setting mode by passing through the data processing path 1. Then, after the setting path start packet passes through the respective processing modules used on the data processing path 1, the input/output unit 101 discharges the packet.

In the communication unit 102-1, which can suspend the input from the input/output unit 101, the comparison unit 303 detects a connection ID to be captured and captures the setting path start packet. Then, the comparison unit 303 of the communication unit 102-1 outputs the data processing completion detection signal 306 to the determination unit 304. If it is determined that the setting path start packet can be captured by the input/output unit 101, the comparison unit 303 determines that a series of data processing has been completed according to a signal 263, and inputs them into the transmission unit 204. The signal is input into the data processing termination detection unit 406, and resets the stall signal 254 from the output control unit 403, which has blocked transfer of subsequent data to the packet. The output control unit 403 inhibits packet generation (output of a processing module itself) performed by the packet generation unit 404. The processing of the packet generation inhibition may be carried out by, for example, a processing module to which a value present in the output control unit 403 has been set.

Next, processing of setting up the data processing path 2 in the setting path will be described below. In order to operate the data processing path 2, it is necessary to change settings (e.g., the receive ID register 301, the reception counter 302, the transmit ID register 401, the transmission counter 402) of registers of each module by the setting path to values corresponding to the data processing path 2. The setting path needs to be processed by each of the communication units capable of communicating, in order to realize a desired data processing sequence. If the setting path is limited to use as data path designed specifically for a register setting, the data processing unit 103 does not always need to capture the connection ID change data, which is stored in the connection ID change packet. In this case, the connection ID change packet is not inhibited from transferring packets between the communication units by the stall signal 254. On the other hand, if the data processing unit 103 of each processing module changes the connection ID, it is necessary to issue an instruction for clearing the stall signal 254 via the signal line 263 from the data reception unit 201.

The data reception unit 201 and the data transmission unit 204 update registers which they have, while referring to the connection ID change data. Then, since the processing module is present on the setting path, the data transmission unit 204 outputs a value stored in the connection ID change packet as it is without changing it, to the output terminal 259 by controlling the selector 203. Then, the packet generation unit 404 rewrites a setting value of the path setting unit 405 to a value indicating the data processing mode in the next clock cycle, and clears the stall signal 254.

When a packet that write-accesses the path setting unit 405 is processed, the packet generation unit 404 may perform rewriting of the setting value of the path setting unit 405 in the data processing mode. Even in this case, the processing reflecting the rewritten value cannot be started until the next clock cycle of write access.

The connection ID change packet is output from the communication unit 102-1 connected to the input/output unit 101, to the ring bus, and is processed in all other communication units 102. When the packet returns after going around the ring bus, it is assumed to be output from the data input/output unit 101.

As described above, when each module is set by the setting path start packet, even if data of the data processing path 1 currently being processed is left, each module blocks a transfer of the packet until setting of the data processing path 2 is completed. Therefore, the connection ID change packet of the setting path has no effect on the data processing of the preceding data processing path.

On the data processing path 2, a series of processing corresponding to the data processing path 2 is implemented based on the connection ID and the count value set on the setting path. In accordance with the above-described procedure, a series of data processing can be performed in an arbitrary sequence using the data processing units 103. When processing of yet another data processing path 3 is performed, the setting path start packet 1 is streamed, in a similar manner, and subsequently settings of registers of respective processing modules are set to adapt to the data processing path 3 using the connection ID change packet on the setting path.

When switching from the setting path to the data processing path 2, a blockage performed by the output control unit 403 described above is not necessarily required. More specifically, the data to be processed by the data processing path 2 may be input from the data input/output unit 101 to follow the connection ID change packet. This is because the connection ID change packet will be in no case overtaken by other packets. This is in addition because, in the modules through which the connection ID change packet passes, settings (correspondence among connection IDs, count values and registers) for the data transfer of the data processing path 2 have been completed in the next clock cycle which has passed. Hence, even if the transfer is started without blocking, it never fails.

On the other hand, when switching from the data processing path 1 to the setting path, there is a possibility that the connection ID change data in the setting path may change settings (connection ID and counter value) of a register that implements the data processing path 1. Therefore, after processing of the data processing path 1 has been completed, it is necessary to continue transferring the connection ID change data in the setting path.

FIG. 5 illustrates a schematic configuration of a data processing apparatus including a data processing unit 820. A system control unit 800 includes a central processing unit (CPU) 801 for arithmetic control, a read-only memory (ROM) 802 that stores fixed data and programs, a random-access memory (RAM) 803 used for temporary saving of data and loading of programs, and an external storage device 804 for holding external data. The RAM 803 may be diverse such as static RAM (SRAM) and dynamic RAM (DRAM), or may be plural. Alternatively, a portion thereof may be a function inside the CPU 801.

A data input unit 810 captures data to be processed from the outside of the system. The data input unit 810 may be, for example, an image reading apparatus including devices such as an image scanner and an analog-to-digital (A/D) converter, or an voice input device including devices such as a microphone and the A/D converter.

A data output unit 830 externally outputs data processed by the data processing apparatus. The data output unit 830 may be, for example, an image output device including a printer device for converting image data into print dot patterns and outputting them, an voice output device for outputting voice data through a digital-to-analog (D/A) converter or the like. Data that has been input in the data input unit 810 may be sent to the system control unit 800 and processed by the CPU 801, or may be temporarily recorded as it is on the RAM 803 or the external storage device 804. Hence, the data processing unit 820 may perform processing by directly receiving input data from the data input unit 810, or may perform processing according to instruction and data supply from the system control unit 800.

In this case, output of the data processing unit 820 may be sent again to the system control unit 800, or may be directly sent to the data output unit 830. Under control of the system control unit 800, various data processing contents are set to the data processing unit 820. According to the set processing content, the data processing unit 820 processes supplied data and outputs the processed data.

The system control unit 800 sends the above-described setting path start data and the connection ID change data to the data processing unit 820. Here, the CPU 801 sends to the data processing unit 820 the connection ID change data according to the processing that the data processing unit 820 performs.

Next, an outline when the data processing unit 820 is switched from a state of processing on the data processing path 1 (first data processing path) by a user or an application, to a state of processing on the data processing path 2 (second data processing path) will be described below with reference to the configuration in FIG. 5. First, the system control unit 800 checks if data to be processed on the data processing path 1 continues to be input from the data input unit 810, or data to be processed on the data processing path 1 is left in the RAM 803. In a case where the data processed on the data processing path 1 is being input, or left therein, the system control unit 800 registers the setting path start data on the RAM 803 to allow the CPU 801 to process the setting path start data at the end of the data processing path 1. On the other hand, in a case where the data to be processed on the data processing path 1 is not being input, or not left, the system control unit 800 sends the setting path start data to the data processing unit 820. Upon completion of registration of the setting path start data on the RAM 803 or transmission to the data processing unit, the system control unit 800 issues the connection ID change data.

The external storage device 804 stores in advance contents to be processed by the data processing unit 820, and the connection ID change data corresponding to the contents to be processed. Alternatively, a portion of the connection ID change data for segmentalized representative processing is stored in the external storage device 804. The CPU 801 may analyze processing contents, and may create the connection ID change data according to the processing, which a user wishes the data processing unit 820 to process. The system control unit 800, if the setting path start data is left in the RAM 803, registers the connection ID change data as the data to be sent to the data processing unit 820 next to the setting path start data. On the other hand, if the connection ID change data is not left in the RAM 803, the system control unit 800 sends the setting path start data to the data processing unit 820. When the system control unit 800 finishes registration or transmission of the setting path start data, the data input unit 810 is permitted to input the data to be processed on the data processing path 2.

By using the configuration as described above, even if settings of the data processing path 2 have not been completed in all processing modules, timings at which to input the data to be processed on the data processing path 2 can be ensured without colliding with the preceding data processing path 1. Consequently, efficient switching of data paths is implemented, and a timing to start processing of the data path after switching can be expedited. In addition, even if processing that might exert an influence on the preceding data path, such as changing a setting of the connection ID, has been performed, it is only necessary to place data (setting path start data) for switching setting of the path setting unit 405 at front end. Consequently, at a device side to which data is input from the input terminal 151, it is not necessary to be conscious of a processing state inside the data processing apparatus, but continuous data processing becomes possible.

In an image processing apparatus according to the present exemplary embodiment, since there is no need to perform centralized management of corresponding relationships of data transfers between the input module and the processing modules, a number of wirings can be reduced compared with a technology discussed in Japanese Patent Application Laid-Open No. 11-167560. (In a technology discussed in Japanese Patent Application Laid-Open No. 11-167560, although the data path is implemented by transferring the data with destination information added, corresponding relationships of the data transfers between the modules are subjected to the centralized management by a table. As a result, not only management becomes more complicated as the number of the processing modules increases, but also wirings grow in number.)

In the image processing apparatus according to the present exemplary embodiment, since there is no need to reset the modules at one time, settings of other modules can be changed, even if there is a processing module in which the data is being processed. Accordingly, switching processing can be performed more efficiently than that in a technology discussed in Japanese Patent Application Laid-Open No. 9-091262. (In a technology discussed in Japanese Patent Application Laid-Open No. 9-091262, a register for setting an ID of the module and a flag indicating if the register has been set are provided in each module. Then, switching of the data paths is implemented by issuing an ID setting command from a module that has become a master. However, a module to which the flag has been set up by the ID setting command does not process the subsequently received ID setting command, which will be passed to the modules at a subsequent stage. For this reason, in order to overwrite the ID, it is necessary to reset all modules at one time to invalidate the flag.)

Regarding the communication units 102 connected to the data processing units 103, signal lines, such as a signal line 263 illustrated in FIG. 2, for notifying that a series of data processing between the data reception unit 201 and the data transmission unit 204 has been completed may be omitted. A circuit for determining that a series of the data processing has been completed in the data reception unit 201, and a data processing termination detection unit in the data transmission unit 204 may be omitted, and a configuration limited to a function of transferring the data also may be used. Even if all of the communication units 102 are in the same configuration, only data from the data input/output unit 101 can be suspended by differentiating an address of the communication unit connected to the data input/output unit 101, from those of other communication units.

FIG. 6A is a block diagram illustrating a configuration of a data processing apparatus according to another exemplary embodiment. In the descriptions as described below, the same numerical references denote configurations and steps having the same function as those in the above-described figures, and description of the same configuration, or function will be omitted. As illustrated in the figure, the data processing unit 820 includes a data input unit 901, a data output unit 902, a communication unit 903 connected to the data input unit 901, and a communication unit 904 connected to the data output unit 902. The data processing apparatus illustrated in FIG. 6A is an apparatus in which the data input unit 901 and the data output unit 902 are arranged in different modules. Operations of the data input unit 901 and the data output unit 902 are operations of the data input/output unit 101 separating an input side and output side.

The communication unit 903 and the communication unit 904 have similar configuration to that of the communication unit 102. However, the data reception unit 201 of the communication unit 904 that connects the data output unit 902, sends a signal 263 of the determination unit 304 to the data transmission unit 204 of the communication unit 903 of the data input unit 901 via the signal line 910. In this way, a signal 910 for notifying that a series of data processing has been completed is input from the communication unit 904 that connects the data output unit 902, to the communication unit 903 that connects the data input unit 901. At this time, the data reception unit 201 of the communication unit 904 that connects the data output unit 902 that generates the signal 910 determines whether a series of data processing has been completed according to an address that designates the path setting unit 405 of the communication unit 903.

As described above, addresses that designate the path setting units 405 are held in association in the communication unit 903 on the input side and the communication unit 904 on the output side. By referring to the address, the communication unit 904 can detect data that has switched a setting of the designated path setting unit 405, and determine whether a series of data processing has been completed. Consequently, even in a case where modules serving as input and output of the data path are separated, processing of two data processing paths before and after switching is ensured to be performed without influencing each other. The data reception unit 201 of the communication unit 903 that connects the data input unit 901, and the data transmission unit 204 of the communication unit 904 that connects the data output unit 902, may be omitted respectively.

FIG. 6B is a block diagram illustrating a schematic configuration of the data processing apparatus according to another exemplary embodiment of the present invention. As illustrated in FIG. 6B, a data processing unit 820 includes a communication unit 1002 connected to a data input/output unit 101, and communication units 1003 connected to the data processing units 103. The communication unit 1002 and the communication units 1003 are both provided with a function of transferring packets, similarly to the communication units 102. Next, an operation of a data processing termination detection unit 1101 in FIG. 7A, and operation of a packet generation unit 1201 in FIG. 7B will be described.

Figure 7A:
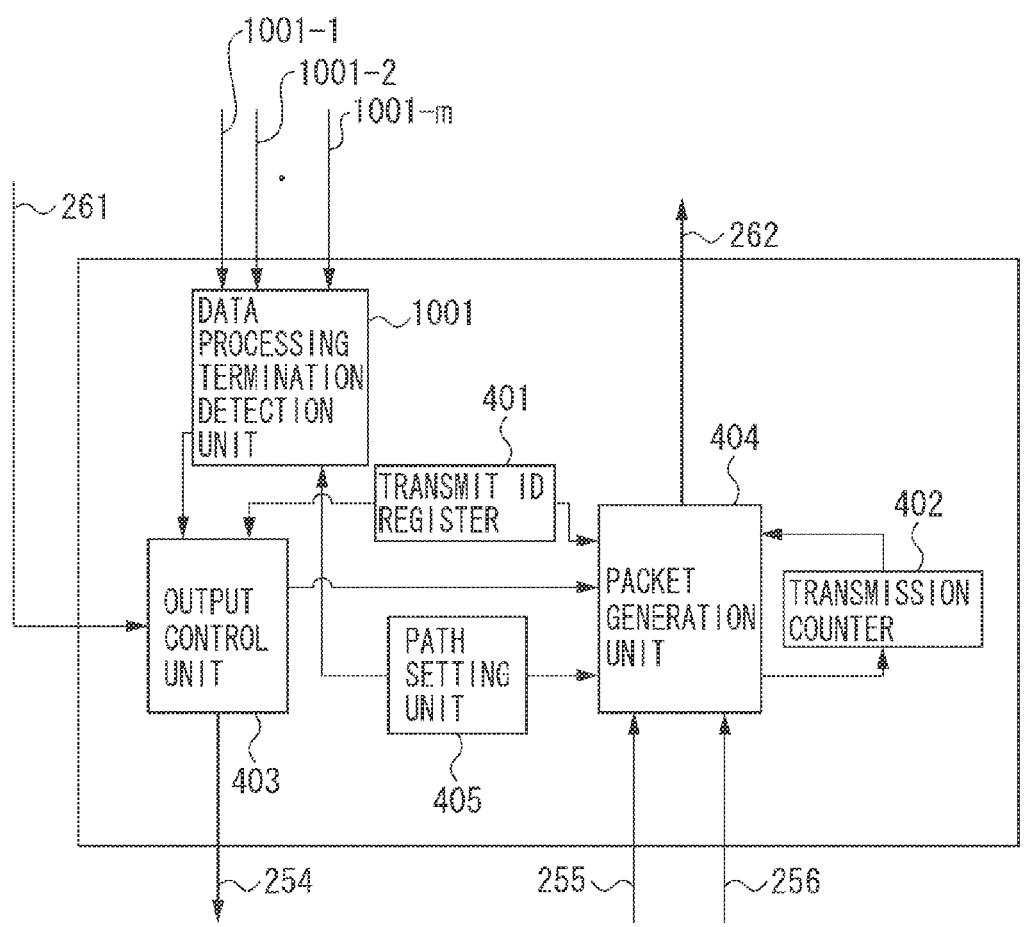
FIGS. 7A and 7B are block diagrams illustrating schematic configurations of data transmission units of respective communication units.

First, an operation of the data processing termination detection unit 1101 will be described. FIG. 7A is a block diagram illustrating a configuration example of the communication unit 1002 connected to the input/output unit 101. The communication unit 1002 includes the data processing termination detection units 1101 for inputting a plurality of data processing termination signals 1001. The data processing termination signals 1001, as described below, are signals for notifying states of a series of data processing performed by a processing module. The data processing termination detection unit 1101 generates a signal to be output to the output control unit 403 out of the plurality of data processing termination signals 1001. A register can set how to enable a plurality of data processing termination signals 1001. For example, a signal 1001 from the last processing module in the order of usage may be enabled. If it is not a signal from the last processing module in the order of usage, a signal 1001 from a processing module positioned where it is ensured that the data is not influenced even if a block is released, may be enabled. Alternatively, a block may be released when a plurality of processing modules is designated and termination of all the modules is detected.

Figure 4C:
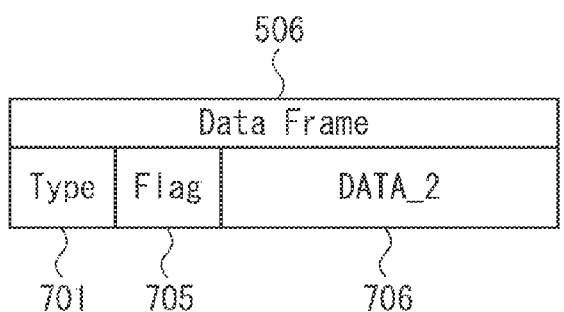
Figure 7B:
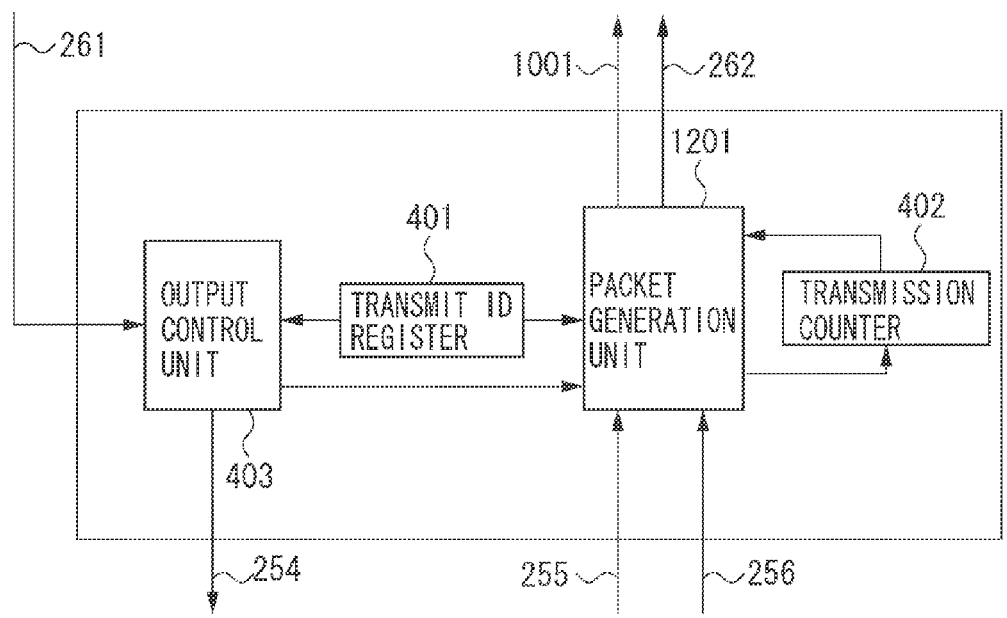

Subsequently, an operation of the packet generation unit 1201 will be described. FIG. 7B is a block diagram illustrating one configuration example of the communication unit 1003 connected to the data processing unit 103. The packet generation unit 1201 of the communication unit 1003 connected to the data processing unit 103 generates a data processing termination signal 1001 in addition to a function of the packet generation unit 404. The data processing termination signal 1001 indicates that a series of the data processing has been completed in the data processing unit 103 of the processing module, and the data processing has been completed based on notification from the data processing unit 103 by a flag 705 illustrated in FIG. 4C. Alternatively, data processing may be completed when data having a particular bit pattern, such as the setting path start data or the connection ID change data for switching between settings of the path setting units 405 has been detected.

One signal out of a plurality of data processing termination signals 1001 to be input into the data processing termination detection unit 1101, may be taken as a signal 263 input from the data reception unit 201. Alternatively, the packet generation unit may be connected inside the module as 1201 in FIG. 7A.

Procedures for switching between settings of the data processing termination detection unit 1101 and the path setting unit 405 will be described below. In order to switch settings, it is necessary to get access to different registers. As a result, at the shortest, a delay of 1 cycle appears in timing to receive data to be set from the input terminal 255. If the data processing termination detection unit 1101 is set before, as described above, determination of a block cancellation of the path setting unit 405 may be changed. Therefore, timing of block cancellation in the previous setting is timing to actually enable the change. On the other hand, if switching of the path setting unit 405 is performed before, the succeeding data is blocked. Consequently, it becomes possible to establish setting without exerting an influence on the preceding data path, at timing that data for switching the setting of the data processing termination detection unit 1101 is input from the input terminal 255. These procedures may be ensured a use as a protocol at a control side, by selecting one or the other, or a control may be dynamically switched by, for example, switching mutual settings and providing a counter of data.

As described above, when the data path is switched, a transfer start of a packet of the succeeding data path is ensured, based on a processing termination state of a particular processing module in the preceding data path. Consequently, processing of the succeeding data path can be started at timing that does not exert an influence on processing of the preceding data path. By starting transfer of the succeeding packet based on termination state of a particular processing module, it becomes possible to shorten overhead at the time of switching the data paths that increases as a number of the processing modules increases.

In the above-described exemplary embodiments, when each processing module is placed into the setting mode, each processing module captures data of a field 506 for an input packet while neglecting values of fields 501 through 505. However, if respective IDs corresponding to a plurality of data paths are registered on the receive ID register 301 and the transmit ID register 401 of the communication unit 102 of each processing module, processing according to the data path which the input packet belongs to can be performed. In this process, when the communication unit 102-1 packetizes data to be input into the data processing unit 820, a path ID is set, and, for example, the communication unit 102 sets the data processing path 1, if the path ID is "0", and sets the data processing path 2, if the path ID is "1". Consequently, if switching operation is performed within a range of the data path set to the communication unit 102 of each processing module, the need to input a packet, in which the connection ID is rewritten, into each module will be eliminated.

Processing of switching the data paths (data processing path 1→the data processing path 2) according to the above-described configurations will be described in sequence. First, the system control unit 800 inputs the setting path start data that stores a command of write access to the path setting unit 405 of the communication unit 102-1 into the data processing unit 820. The communication unit 102-1 sets a register of the path setting unit 405 to "1" according to the command of write access that is input (default is "0").

Subsequently, a transfer of data (packets) to be processed on the data processing path 2 is started from the data input/output unit 101. The communication unit 102-1 adds "1" to a path ID 505 of a packet, since the path setting unit 405 is set to "1". Other communication units process the packets to which "1" is added as the path ID 505, on the data processing path 2. The input module recognizes that it is a case of switching the data paths within a range set in the communication unit 102, and only the input module may be set, based on the setting path start data. In that case, the system control unit 800 stores the path ID corresponding to the data path set to the input module in a table or the like, and a path ID that does not overlap with the stored path ID may be added to the setting path start data when switching is performed.

Other Embodiments

Aspects of the present invention also can be realized by a computer of a system or apparatus (or devices such as a CPU or MPU) that reads out and executes a program recorded on a memory device to perform the functions of the above-described embodiment(s). Aspects of the present invention also can be realized by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While in the above-described exemplary embodiments, a valid flag indicating that a packet is enabled is used, a length of the packet may be shortened, by handling a particular connection ID (for example "0") as an invalid packet (equivalent to valid flag "0"). Further, data to be externally acquired may be input as it is in a format of a packet to be handled on the ring bus. Moreover, the processing unit may interpret the packet, and the packet may be processed as it is.

A schematic configuration diagram of each unit of the data processing apparatus used in the above-described exemplary embodiments is used to describe connection relationship of circuit and function, and is not intended to limit positional relationship and number of pieces of each configuration. For example, in order to implement the present invention, it is only necessary to include three or more communication units (including the data input/output units). Further, it is only necessary to include two or more data processing units (processing modules). The processing modules may be formed as separate chips, or may be formed as single chip. It also is the same for the data processing units and the communication units. As a matter of course, configuration of the present invention may be formed as one chip.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-151478 filed Jun. 25, 2009, which is hereby incorporated by reference herein in its entirety.

What is claimed is:

1. A data processing apparatus, comprising:
an input unit configured to input data; and
a plurality of processing modules connected to form a ring bus, wherein each processing module is configured to transfer data along the ring bus to an adjacent processing module in one direction in a connected sequence, and wherein at least one of the plurality of processing modules includes:
a communication unit configured to implement a first data processing path and a setting path, and
a processing unit configured to process data received from the communication unit, and to output processed data back to the communication unit,
wherein the first data processing path is for transferring first path data in such a manner that a set sequence of processing units performs processing on the first path data in the set sequence, and
wherein, in response to receiving switching data, the switching data is processed by the communication unit on the first data processing path in the set sequence to switch from the first processing path to the setting path, wherein the communication unit blocks transferring of data subsequent to the switching data until completion of data processing is detected.

2. The data processing apparatus according to claim 1, wherein a first communication unit includes a suspending unit, is connected to the input unit to form a processing module, and is configured to receive first path data and then receive the switching data while the first path data is being processed by the set sequence of processing units, and, in response to the suspending unit receiving the switching data from the input, the suspending unit transmits a suspend signal to the input unit to suspend further input of data from the input unit into the bus.

3. The data processing apparatus according to claim 2, wherein, in response to the switching data being transferred from the first communication unit, around the ring bus, and back to the first communication unit, the suspending unit transmits a clear signal to the input unit to permit further input of data from the input unit into the ring bus.

4. The data processing apparatus according to claim 2, wherein, in response to the switching data being transferred from the first communication unit, around the ring bus, and back to the first communication unit, the input unit inputs, into each communication unit in the connected sequence, changing data that changes a setting of each of communication unit to a setting that enables execution of a second data processing path that is different from the first data processing path.

5. The data processing apparatus according to claim 4, wherein the changing data is configured to switch a processing module to be used for the second data processing path from a state of being processed on the setting path to a state of being processed on the second data processing path.

6. The data processing apparatus according to claim 2, further comprising:
an output unit configured to output data from the data processing apparatus that has been processed to completion by the plurality of processing modules,
wherein, upon receiving the switching data, a communication unit that is configured to transmit data to the output unit sends a notification signal to a processing module that has suspended an input from the input unit and, in response to receipt of the notification signal, the processing module that suspended the input from the input unit releases the suspension to allow input from the input unit.

7. The data processing apparatus according to claim 1, wherein each communication unit is configured to add a count value and identification information to processed data received from an associated processing unit, wherein each count value represents a sequence and each identification information represents a sequence of processing data.

8. The data processing apparatus according to claim 7, wherein a register is configured to set each count value and a connection ID.

9. A data processing apparatus, comprising:
a control unit;
an input unit configured to input data;
a plurality of processing modules connected to form a ring bus, wherein each processing module is configured to process the data in response to an instruction from the control unit, and wherein at least one of the plurality of processing modules includes:
a first storage unit configured to store first identification information for identifying data to be received and processed,
a second storage unit configured to store second identification information to be added to processed data and to be output,
a reception unit configured to receive data transmitted from an upstream processing module in one direction,
a processing unit configured to process data received from the reception unit, and to output processed data,
a transmission unit configured to transmit to a downstream processing module data processed by the processing unit,
an output control unit configured to control output such that the transmission unit transmits data that the processing unit has processed, and
a switching unit configured to switch the processing module to implement a first data processing path that is different from a second data processing path and a setting path,
wherein the first data processing path is for transferring first path data according to the first identification information and the second identification information in such a manner that a set sequence of processing units performs processing on the first path data in the set sequence, wherein the second data processing path is implemented by changing settings of a first and second identification information of the plurality of processing modules,
wherein, in response to receiving switching data, the switching data is processed on the first data processing path in the set sequence to switch from the first processing path to the setting path, wherein the switching unit blocks transferring of data subsequent to the switching data until completion of data processing is detected, and
wherein, when implementing the second data processing path after switching to the setting path, the control unit is configured to input into the input unit changing data for changing setting of the first and second identification information, before inputting the second path data to be processed on the second data processing path.

10. A data processing apparatus, comprising:
an input module;
a plurality of processing modules to receive input from the input module, wherein the plurality of processing modules and the input module are connected to form a ring bus, and each processing module is configured to transfer data along the ring bus to an adjacent processing module in one direction in a connected sequence, and wherein at least one of the plurality of processing modules includes:
a communication unit configured to implement a first data processing path, a setting path, and a second data processing path that is different from the first data processing path, and
a processing unit configured to process data received from the communication unit, and to output processed data back to the communication unit,
wherein the first data processing path is for transferring first path data in such a manner that a set sequence of processing units performs processing on the first path data in the set sequence,
wherein, in response to receiving switching data, the switching data is processed by the communication unit on the first data processing path in the set sequence to switch from the first processing path to the setting path, wherein the communication unit blocks transferring of data subsequent to the switching data until completion of data processing is detected, and
wherein the input module is configured to add a path ID to input for identifying whether to process input data on the first data processing path or the setting path.

11. A data processing method in a data processing apparatus having an input unit configured to input data and a plurality of processing modules connected to form a ring bus, wherein each processing module is configured to transfer data along the ring bus to an adjacent processing module in one direction in a connected sequence, the data processing method comprising:
communicating to implement a first data processing path and a setting path, and
processing received data and outputting processed data,
wherein the first data processing path is for transferring first path data in such a manner that a set sequence of processing performs processing on the first path data in the set sequence, and
wherein, in response to receiving switching data, the switching data is processed on the first data processing path in the set sequence to switch from the first processing path to the setting path, wherein transferring of data subsequent to the switching data is blocked until completion of data processing is detected.

12. A non-transitory computer-readable storage medium having stored thereon, a program for controlling a data processing apparatus having an input unit configured to input data and a plurality of processing modules connected to form a ring bus, wherein each processing module is configured to transfer data along the ring bus to an adjacent processing module in one direction in a connected sequence, wherein the program executes:
communicating to implement a first data processing path and a setting path, and
processing received data and outputting processed data,
wherein the first data processing path is for transferring first path data in such a manner that a set sequence of processing performs processing on the first path data in the set sequence, and
wherein, in response to receiving switching data, the switching data is processed on the first data processing path in the set sequence to switch from the first processing path to the setting path, wherein transferring of data subsequent to the switching data is blocked until completion of data processing is detected.

13. The data processing apparatus according to claim 1, wherein, in response to the input unit receiving switching data, the switching data is circulated in the set sequence through each processing unit without being processes by the processing units and output to an associated communication unit to switch each associated communication unit from the first processing path to the setting path, wherein the communication unit blocks transferring of data subsequent to the switching data until completion of data processing is detected.

14. The data processing apparatus according to claim 1, where the switching data is processed by a communication unit such that the switching data is used to perform setting processing to switch a communication unit corresponding to a processing unit, that has finished data processing for first data processing path, to a second data processing path that is different from the first data processing path.

15. A data processing apparatus, comprising:
   an input unit configured to input data; and
   a plurality of processing modules connected to form a ring bus, wherein each processing module is configured to transfer data along the ring bus to an adjacent processing module in one direction in a connected sequence, and wherein at least one of the plurality of processing modules includes:
   a communication unit configured to perform transmission and reception of data, and
   a processing unit configured to process data received from the communication unit, and to output processed data back to the communication unit,
   wherein, in a case where the data processing apparatus is switched from a state in which the plurality of processing modules performs processing in a predetermined set sequence to a state in which a processing order of the plurality of modules is changed, the communication unit transmits switching data in the predetermined set sequence, and
   wherein the communication unit blocks transferring of data subsequent to the switching data until completion of data processing is detected.

16. A data processing method in a data processing apparatus having an input unit configured to input data and a plurality of processing modules connected to form a ring bus, wherein each processing module is configured to transfer data along the ring bus to an adjacent processing module in one direction in a connected sequence, the data processing method comprising:
   performing transmission and reception of data, and
   processing received data received, and outputting processed data,
   wherein, in a case where the data processing apparatus is switched from a state in which the plurality of processing modules performs processing in a predetermined set sequence to a state in which a processing order of the plurality of modules is changed, performing transmission and reception of data includes transmitting switching data in the predetermined set sequence, and
   wherein transferring of data subsequent to the switching data is blocked until completion of data processing is detected.

* * * * *